(No Model.)
I. J. TRENCH.
ADJUSTABLE NUT FOR AXLES.
No. 473,272. Patented Apr. 19, 1892.
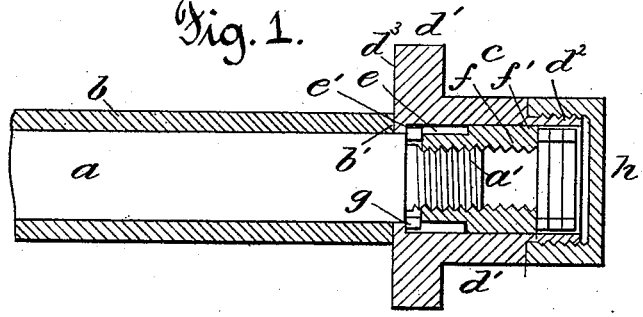
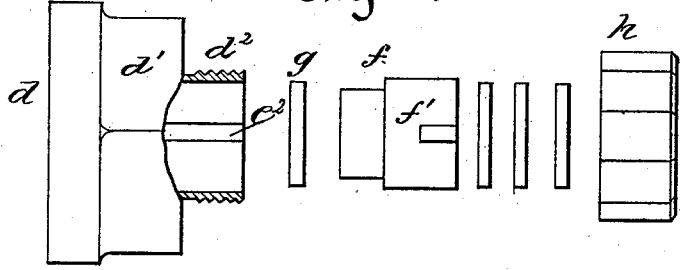
Witnesses
Inventor
Ira J. Trench,
by Chas. L. Burdett,
Attorney.

UNITED STATES PATENT OFFICE.

IRA J. TRENCH, OF MIDDLETOWN, CONNECTICUT.

ADJUSTABLE NUT FOR AXLES.

SPECIFICATION forming part of Letters Patent No. 473,272, dated April 19, 1892.

Application filed January 22, 1892. Serial No. 418,902. (No model.)

*To all whom it may concern:*

Be it known that I, IRA J. TRENCH, of Middletown, in the county of Middlesex and State of Connecticut, have invented certain new and useful Improvements in Adjustable Nuts, of which the following is a full, clear, and exact description, whereby any one skilled in the art can make and use the same.

The object of my invention is to provide a device by means of which the end wear on an axle-arm or axle-box may be taken up without requiring the recutting of any of the parts. In use the nut that comes in contact with the end of the axle-box that is commonly used on wagons and other vehicles wears in such manner as to leave the wheel loosely supported on the axle-arm by giving end-play to the hub within which the axle-box is secured. This wear is usually taken up by removing the nut and wheel and cutting back the thread on the axle-arm. This difficulty is overcome by my invention.

My invention consists in the details of the several parts making up the adjustable nut as a whole and in the combination of such parts with the axle-box and axle-arm, as more particularly hereinafter described, and pointed out in the claims.

Referring to the drawings, Figure 1 is a detail view, in lengthwise section, through a nut embodying my invention. Fig. 2 is a detail view showing the several parts composing the adjustable nut separated, with parts cut away to illustrate the construction.

In the accompanying drawings the letter $a$ denotes an axle-arm of usual construction, $b$ an axle-box, and $c$ the adjustable nut as a whole. This latter comprises the body part $d$, preferably of disk shape, having a squared portion $d'$ and beyond that a threaded portion $d^2$. Within this body part is a socket $e$, having a shoulder $e'$ at the bottom of the socket near the bearing-face $d^3$ of the nut, that comes in contact with the end $b'$ of the axle-box and with the end of the hub of the wheel when the parts are in place. A thimble $f$ fits within the socket in the body part and is provided with a thread of a size and proper pitch to adapt it to be screwed upon the threaded end $a'$ of the axle-arm. This thimble has ribs $f'$ on its outer surface, that fit into the grooves $e^2$ in the wall of the socket $e$ for the purpose of enabling the thimble to be turned with the body part of the nut. These two parts $d$ and $f$, in fact, comprise the nut. The object of the shoulder $e'$ is to provide a seat within the socket for the purpose of receiving a washer $g$, that is introduced into the socket for the purpose of taking up or compensating for the wear on the face $d^3$ or on the surface with which the face $d^3$ of the nut has been in rubbing contact. The thimble is of such length as to leave in the outer part of the socket a space within which a surplus number of washers may be packed, and this socket is closed by means of a screw-cap $h$, that is screwed upon the threaded outer end of the nut-body.

When the parts are assembled, as shown in Fig. 1 of the drawings, the device is in proper shape for use, and the body part, thimble, washer, and cap make up the nut as a whole. When thus assembled, such a nut is screwed upon or removed from the end of an axle-arm in any manner. It is only necessary to take the nut apart when necessary to insert a washer or to remove one for the purpose of adjusting the nut as a whole in proper position on the end of the axle-arm, so as to make a close rubbing fit between the end of the axle-arm or outer face of the hub.

I claim as my invention—

1. In combination in a nut, an outer body part having a lengthwise socket with a shoulder at the inner end and lengthwise grooves in the walls of the socket, a thimble fitting within the socket and having projecting lugs that engage the said grooves, and a thread on the inside of the thimble, all substantially as described.

2. In combination in a nut, an outer body part having a lengthwise socket with a packing-seat at the inner end, a threaded thimble fitting within the socket in the body part and held against rotation therein, and a cap adapted to cover the outer end of the thimble-socket, all substantially as described.

3. In combination with an axle-arm, a nut having a body part with a bearing-face, a squared outer surface, and a lengthwise socket, a packing-shoulder within the socket, a packing-ring fitted within the socket, a threaded thimble held against rotation within the body part of the nut, but free to move lengthwise therein, and a cap covering the outer end of the socket, all substantially as described.

IRA J. TRENCH.

Witnesses:
   HENRY A. TRENCH,
   CARRIE L. TRENCH.